Patented Apr. 28, 1953

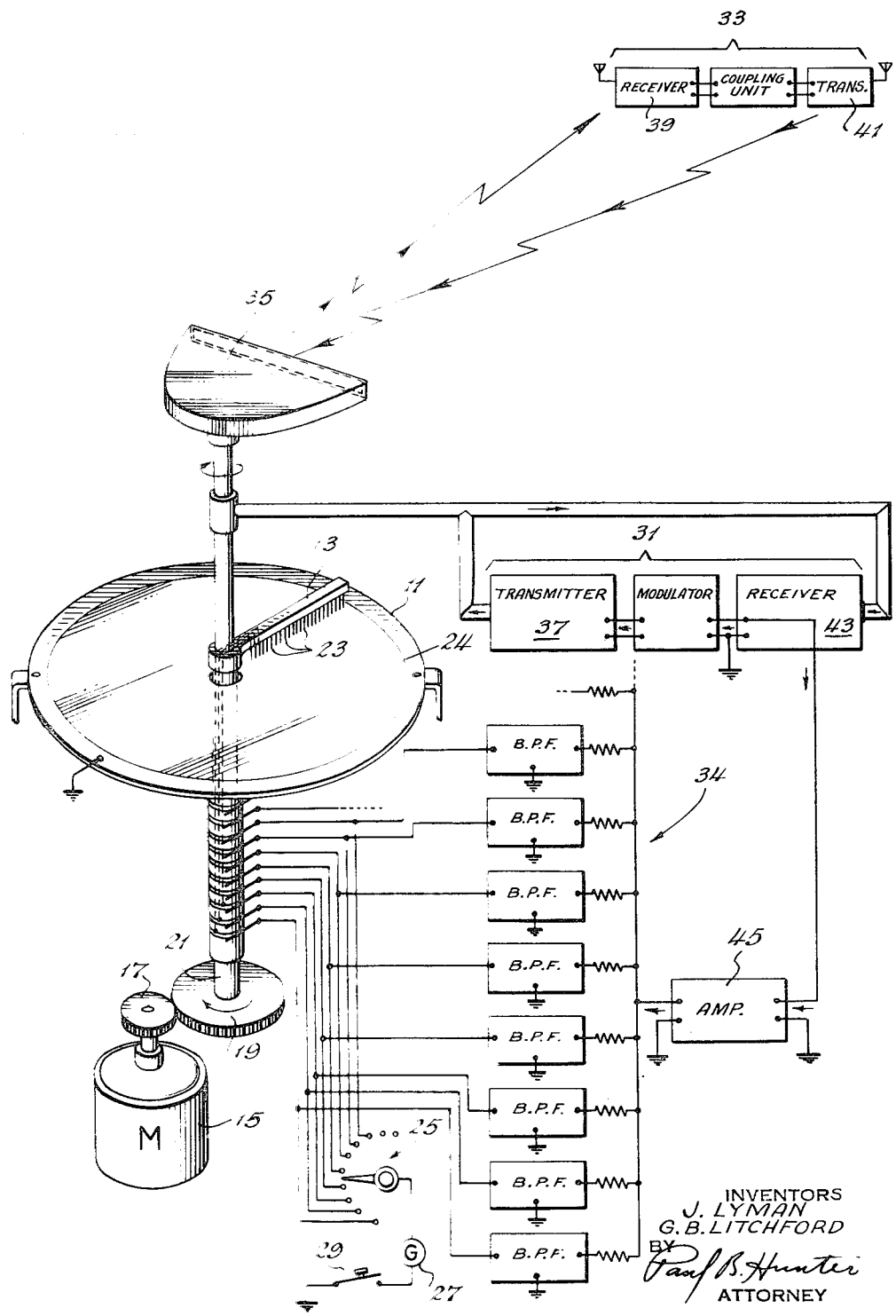

2,637,024

UNITED STATES PATENT OFFICE 2,637,024

CRAFT POSITION PLOTTING SYSTEM

Joseph Lyman and George B. Litchford, Huntington, N. Y., assignors to The Sperry Corporation, a corporation of Delaware Application October 29, 1947, Serial No. 782,848

3 Claims. (Cl. 343—10)

The present invention relates to navigational and guidance systems for movable craft and is particularly concerned with a display system suitable for use in an airport traffic control system.

An object of the present invention is to provide a system for indicating and recording the positions and progress of movable craft in a selected region.

It is a further object to provide a substantially scalar plot of the positions of craft within a predetermined radius of a plotting station position.

These objects are met by the provision of a polar plot system wherein a rotating arm and cooperating graph table are given continuous relative rotation according to the rotation of a selective azimuth direction signalling system. One of the two relatively rotatable parts is separated into a large number of circuit elements in a radial progression from the axis of the polar plot system, and a frequency selective system is connected to the radially spaced elements for energizing an element at the radius scalarly corresponding to craft radius and at the moment when the arm of the system is directed in the azimuth direction corresponding to the craft direction.

The foregoing features and objects will become more clearly apparent from a detailed description of a preferred embodiment of the present invention which is illustrated in the drawing by an oblique view, partly schematic, of the recording apparatus and radio navigational and guidance system of the present invention.

Referring to the drawing, a horizontal disc 11 and an arm 13 extending parallel to a radius of disc 11 are arranged for relative rotation about the axis of disc 11, which may be vertical. A motor 15 is coupled through gears 17, 19 to a shaft 21, upon which is carried one of two rotatable elements 11 or 13. Element 13 is provided with a plurality of electric circuit elements at progressively greater radii, these circuit elements being illustrated in Fig. 1 as a plurality of brushes such as small spring wire elements 23 or styli attached to the arm 13.

An electric voltage responsive recording medium 24 is provided on the disc 11 to be marked at points at which current is passed therethrough. This recording medium may take the form of Teledeltos paper, or it may be any other recording medium for example, an electrolytic recording sheet. Preferably, to have the directions on the recording medium 24 correspond at all times to the compass directions, element 11 is held stationary and the motor 15 is arranged to produce relatively slow rotation of element 13. An operator may produce a mark at any desired point on the recording medium 24 by setting a selector switch 25 to the contact position corresponding to the desired radius and depressing a key 29 to supply current from a generator 27 at the moment the arm 13 passes through the angular position corresponding to the desired indication point. Thus, a selective polar plotting system is achieved.

Connections may be so arranged that a radio transmitting and receiving system automatically provides marks representing the positions of craft in the vicinity of the plotting station. For this purpose, a craft range determining system involving a local fixed radio transmitting and receiving system 31 and a craft-borne radio receiving and transmitting system 33 is provided for generating a modulation frequency varying as a predetermined function of the craft distance, and a frequency selective system 34 is employed for energizing that one of brushes 23 at the radius corresponding to the craft distance. Furthermore, an arrangement such as a directive antenna 35 rotated synchronously with the arm 13 is provided for limiting the plotting for each craft to a very short period of time when the arm 13 is angularly positioned according to the azimuth bearing of the craft.

The transmitter-receiver system 31, 33 may be any arrangement for providing frequencies unambiguously related to distance, an illustrative system for this purpose being that set forth in Nicolson Patent No. 1,945,952 issued February 6, 1934.

In such a system, the fixed station transmitter 37 and the airborne receiver 39 are arranged for operation at a first radio frequency and the airborne transmitter 41 and fixed station receiver 43 are operated at a different carrier frequency for avoidance of interference therebetween. If operated according to the Nicolson patent, the receivers in systems 31 and 33 are arranged to modulate the respective transmitters in such a way that transmitter 41 commences to emit radio frequency energy at the moment of reception in receiver 39 of energy from transmitter 37, and the energy transmission from transmitter 37 is abruptly ended by the rise of output from receiver 43 at the moment of commencement of reception of energy from transmitter 41. The airborne system 33 is so arranged that the transmitter 41 thereof transmits only during the periods of reception by receiver 39 and the fixed station system 31 is so arranged that transmitter 37 is prevented from transmitting only during signal reception in receiver 43.

Equipments 31, 33 thus act as a closed loop modulation signal generator arrangement. The demodulated output appearing at the output terminals of receiver 43 is amplified in an amplifier 45 and supplied to the input circuits of the several band-pass filters in the frequency selective network 34. The respective output circuits of the band-pass filters in network 34 are connected to respective ones of the wire-like elements 23 through respective brushes and slip rings as shown in the drawing, the pass band frequencies corresponding to radius scalarly according to craft range.

As motor 15 slowly rotates the antenna 35 and the arm 13, e. g. at 10 R. P. M., the radio system 31 at the fixed station acts through a highly directive antenna 35 to cooperate with the craft-borne radio systems in craft located at progressively greater azimuth angles, the antenna 35 acting to insure that only the craft in the direction corresponding to the momentary direction of arm 13 can respond and be represented on the polar plotting system. Upon response of a craft system 31, a modulation or switching frequency is produced corresponding to the craft distance, e. g., a 9300 cycle signal for a craft at a distance of ten miles, and the appropriate band-pass filter accordingly provides an appreciable output voltage between the corresponding brush element on arm 13 and the disc 11. Hence the electric voltage sensitive recording medium is provided with a mark at the point momentarily occupied by the energized brush, so that the craft position as to azimuth angle or bearing and range or distance is fully represented in the plotting system.

If the craft travels directly toward the fixed station 11, 13, 31, 35, the generated modulation frequencies will be successively higher as communication is established with the craft at successive 1-revolution intervals. Hence, the successively higher-frequency filters pass the output voltages to elements 23 at successively smaller radii. A track of the craft is thus recorded.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Craft position indicating apparatus for indicating and recording the positions and progress of movable craft within a predetermined region of distances from said apparatus comprising first and second relatively rotatable members, said second member being mounted on a rotatable shaft and rotatable therewith about the longitudinal axis of said shaft, the first of said members having a plate-like area for receiving a sheet of electric voltage responsive recording medium and the second of said members comprising a radially extending arm adjacent said plate-like area, said arm member comprising a plurality of electrodes at progressively greater radial spacings from said longitudinal axis of said shaft, said radial spacings corresponding to progressively greater distances within said predetermined region of distances from said apparatus, the electrodes of said arm member being electrically insulated from each other and being closely adjacent to said first member, means for transmitting radio energy to craft lying in a selected direction, receiver means including a directional antenna for receiving radio energy educed from said craft in response to said transmitted energy, said transmitting and receiver means being located at the station of said craft position indicating apparatus, said receiver means being coupled to said transmitting means for modulating the output thereof to produce regular variations in the output of said transmitting means at a frequency related to the distance from said station to said craft, means for rotating said directional antenna and providing relative rotation between said first and second members, in synchronism, for obtaining momentary responses from craft in the successive directions corresponding to the successive relative angular dispositions of said relatively rotatable members, a plurality of slip rings insulated from each other and mounted on said shaft, means connecting respective ones of said electrodes to respective ones of said slip rings, individual brush means adapted to be connected to respective ones of said slip rings, and a plurality of band pass filters each connected between said radio energy receiving means and a respective one of said brushes, and each responsive to that frequency corresponding to the distance of said craft from said position indicating apparatus represented by the radial spacing from said longitudinal axis of the electrode to which it is connected.

2. Craft position indicating apparatus comprising first and second members relatively rotatable about an axis, said first member having a plate-like area for receiving a sheet of electric voltage responsive recording medium and said second member comprising a radially extending arm adjacent said plate-like area, said arm member comprising a plurality of electrodes at progressively greater radial spacings from said axis, the electrodes being insulated from each other and being closely adjacent to said first member, directional means for receiving radio energy from craft lying in a selected direction, means for rotating said directional means and providing relative rotation between said first and second members, in synchronism, for obtaining momentary responses from craft in the successive directions corresponding to the successive relative angular dispositions of said relatively rotatable members, means for producing periodic variations of the radio energy from the craft at a frequency bearing a predetermined relation to the distance of the craft from the craft position indicating apparatus, and a plurality of band pass filters each connected between said radio energy receiving means and a respective one of said electrodes, and each responsive to that frequency corresponding to the distance represented by the radial spacing from said axis of the electrode to which it is connected; said means for producing periodic variations of the radio energy from the craft comprising a first modulated transmitter on said craft, a first receiver and a second transmitter at the station of the craft position indicating apparatus, a second receiver on said craft, said first receiver being receptive to energy arriving from said first transmitter and including an output coupling to said second transmitter for modulating the output thereof according to the detected modulation of said first transmitter, said second receiver being receptive to the output of said second transmitter, and means responsive to the output of said second receiver for regulating the modulation frequency of said first transmitter according to a predetermined phase delay of the energy transmissions over the distance between the craft and the station of the craft position indicating apparatus.

3. Polar recording apparatus comprising first and second adjacent members, said first member containing a plate-like area for receiving a sheet of electric voltage responsive recording medium, a shaft element, said second member comprising an arm element attached to and extending radially from said shaft element, said shaft element being rotatable about its longitudinal axis, said arm element comprising a plurality of styli electrically insulated from each other and being closely adjacent to said first member, successive ones of said styli being located in side by side relationship along said arm element at progressively greater radial spacings from the longitudinal axis of said shaft element, a plurality of slip rings electrically insulated from each other and mounted on said shaft element, respective ones of said slip rings being connected to respective ones of said styli, individual brush means electrically insulated from each other and adapted to be connected to individual ones of said slip rings for rotation-permitting connection thereto, a plurality of filter means, respective ones of said filter means being connected to respective ones of said brushes whereby each of said filter means is electrically connected to respective ones of said styli, means for transmitting radio energy to craft lying in a selected direction, receiver means including a directional antenna for receiving radio energy educed from said craft in response to said transmitted energy, said transmitting and receiver means being located at the station of said craft position indicating apparatus, said receiver means being coupled to said transmitting means for modulating the output thereof to produce regular variations in the output of said transmitting means at a frequency related to the distance from said station to said craft, each of said filter means being connected to said receiver means and responsive to a different frequency whereby an electric voltage may be selectively applied in response to said filters between one of said styli and said first member for producing a point-actuation of the voltage responsive recording medium.

JOSEPH LYMAN.
GEORGE B. LITCHFORD.

References Cited in the file of this patent

UNITED STATES PATENTS

| Number | Name | Date |
|---|---|---|
| 907,235 | Herrick | Dec. 22, 1908 |
| 1,700,399 | Bruhn | Jan. 29, 1929 |
| 2,369,662 | Deloraine | Feb. 20, 1945 |
| 2,418,490 | Turner | Apr. 8, 1947 |
| 2,422,295 | Eaton | June 17, 1947 |
| 2,427,421 | Rieber | Sept. 16, 1947 |
| 2,430,283 | Epstein | Nov. 4, 1947 |
| 2,433,332 | Benioff | Dec. 30, 1947 |
| 2,467,202 | Gardiner | Apr. 12, 1949 |
| 2,476,445 | Lacy | July 19, 1949 |
| 2,501,790 | Silverman | Mar. 28, 1950 |
| 2,517,316 | Holmes | Aug. 1, 1950 |
| 2,534,820 | Hurvitz | Dec. 19, 1950 |
| 2,546,973 | Chatterjea | Apr. 3, 1951 |

FOREIGN PATENTS

| Number | Country | Date |
|---|---|---|
| 813,404 | France | June 1, 1937 |